United States Patent
Popoff et al.

(10) Patent No.: US 7,792,086 B2
(45) Date of Patent: Sep. 7, 2010

(54) METHOD FOR IMPLEMENTING AN INTELLIGENT CONTENT RATING MIDDLEWARE PLATFORM AND GATEWAY SYSTEM

(75) Inventors: Jeff Popoff, San Jose, CA (US); Victor Leung, Victoria (CA); Karthik Ramakrishnan, Burlington (CA)

(73) Assignee: Redknee Inc. (CA)

( * ) Notice: Subject to any disclaimer, the term of this patent is extended or adjusted under 35 U.S.C. 154(b) by 1139 days.

(21) Appl. No.: 10/742,826

(22) Filed: Dec. 23, 2003

(65) Prior Publication Data
US 2005/0135264 A1    Jun. 23, 2005

(51) Int. Cl.
*H04W 4/00*    (2009.01)
(52) U.S. Cl. .................... 370/338; 455/405; 455/407
(58) Field of Classification Search .............. 370/229, 370/254; 455/405, 407
See application file for complete search history.

(56) References Cited

U.S. PATENT DOCUMENTS

| | | | | |
|---|---|---|---|---|
| 6,839,684 | B1 * | 1/2005 | Rissanen et al. | 705/34 |
| 6,961,858 | B2 * | 11/2005 | Fransdonk | 726/29 |
| 6,981,029 | B1 * | 12/2005 | Menditto et al. | 709/217 |
| 7,191,244 | B2 * | 3/2007 | Jennings et al. | 709/231 |
| 7,233,948 | B1 * | 6/2007 | Shamoon et al. | 707/9 |
| 2002/0029197 | A1 * | 3/2002 | Kailamaki et al. | 705/40 |
| 2002/0073167 | A1 * | 6/2002 | Powell et al. | 709/217 |
| 2002/0129088 | A1 | 9/2002 | Zhou et al. | |
| 2002/0132638 | A1 * | 9/2002 | Plahte et al. | 455/555 |
| 2002/0155823 | A1 * | 10/2002 | Preston et al. | 455/406 |
| 2002/0176377 | A1 * | 11/2002 | Hamilton | 370/328 |
| 2003/0099237 | A1 * | 5/2003 | Mitra et al. | 370/393 |
| 2003/0163684 | A1 * | 8/2003 | Fransdonk | 713/153 |
| 2003/0169718 | A1 * | 9/2003 | Hirata et al. | 370/338 |
| 2003/0200313 | A1 | 10/2003 | Peterka et al. | |
| 2005/0177506 | A1 * | 8/2005 | Rissanen | 705/40 |
| 2006/0168225 | A1 * | 7/2006 | Gunning et al. | 709/226 |

\* cited by examiner

*Primary Examiner*—Ricky Ngo
*Assistant Examiner*—Ben H Liu
(74) *Attorney, Agent, or Firm*—Perry & Currier Inc.

(57) ABSTRACT

The method for implementing an Intelligent Content Rating middleware platform and gateway system provides telecommunications carriers and network operators with the ability to define routing and actions based on HTTP/SIP based content and subscriber context through a powerful, extensible Layer 4-7 switching fabric technology. The disclosed embodiments mediate communications between applications and networks for IP packet flows, personal messaging, location-based services, and billing. Furthermore, the disclosed embodiments enable advanced context-sensitive dialogue scenarios with the wireless subscriber such as, but not limited to, Advice-of-Charge dialogues. The disclosed embodiments permit telecommunications network operators and like entities to introduce real-time rating of data services for both prepaid and postpaid subscribers. Further embodiments include the validation of digital signatures, combined with authentication and non-repudiation techniques to ensure subscriber privacy remains protected.

26 Claims, 2 Drawing Sheets

METHOD FOR IMPLEMENTING AN INTELLIGENT CONTENT RATING MIDDLEWARE PLATFORM AND GATEWAY SYSTEM

CROSS-REFERENCE TO RELATED APPLICATIONS

Patent application Ser. No. 10/307,335 entitled "Improved method for implementing an Open Charging (OC) middleware platform and gateway system".

STATEMENT REGARDING FEDERALLY SPONSORED RESEARCH OR DEVELOPMENT

Not Applicable

REFERENCE TO A MICROFICHE APPENDIX

Not Applicable

BACKGROUND ART

New mobile and/or wireless content services such as interactive gaming and music require an entirely new approach to billing and rating. With 'always-on' IP-based networks, telecommunications network operators (and like entities) need new and creative ways to market and price these services, as usage and volume-based pricing simply do not reflect the advances in the art and the 'real' value of data usage. Telecommunications network operators (and like entities) need to discriminate between gratis and chargeable content based on attributes including the content category, the wireless subscriber's class of service, time of day (among others). While the invention disclosed herewith addresses the impending and tangible needs of the state of the art to intermediate IP data flows (as Hyper-Text Transfer Protocol (HTTP) traffic for instance), we submit that much of the prior art remains lacking in this regard, and indeed, does not address prospective needs and contingencies as well.

For instance, U.S. patent application 20030200313 by Peterka et al., entitled Digital rights management system for clients with low level security, details a digital rights management system for determining whether clients are authorized to access content within a communication network, which in the preferred embodiment is implemented as a computer program product (but may be hardware based, or may be a combination of software and hardware). The invention of present seeking the protection of Letters Patent, provides additional layers of innovation as per the very intermediation of the HTTP traffic. The application by Peterka et al. remains basically a computer program product which such intermediation engines or similar products can query for approval and charging, whereas our invention of present, among other elements, is an integrated solution for both functions.

More analogous art and teachings may be gleaned from U.S. patent application 20020129088 by Zhou et al., entitled Content-based billing, details a method and apparatus for content-based billing including techniques for intercepting, modifying, and retransmitting a request between various entities engaged in content-based billing in the context of the World Wide Web. Principally though, said patent application remains tied to HTTP messaging, whereas our invention of present, also addresses other communication protocols including Session Initiation Protocol (SIP). Furthermore, our invention seeking the protection of Letters Patent, provides for real-time interstitial screens, prompts, and menus for the purpose of confirming Age or the acceptance of Charges (among others). The application by Zhou et al. also simply assumes that the information pertaining to the storage of customer and content provider information is stored by the invention, whereas our invention allows for information to be stored by both internal and external databases. Zhou et al. also assumes that a given subscriber is either prepaid or post paid, whereas our invention of present employs a comprehensive rating engine which can characterize a given transaction as being associated with a pre-paid, post-paid, or a configurable billing concept (for instance, as having aspects of both pre-paid and postpaid or other billing concepts). Indeed, the nature of the billing paradigm is affect by a host of attributes including the source, destination, time of date, and location, among others. Furthermore, our invention can accrue a charge to some third party (e.g. a sponsor which subsidizes a portion or all of a service) in addition to allocating revenue to fourth part (e.g. the provider of the service).

| REFERENCES CITED: | | | |
| --- | --- | --- | --- |
| U.S. patent application 20030200313 | October 2003 | Peterka et al. | 709/225 |
| U.S. patent application 20020129088 | September 2002 | Zhou et al. | 709/200 |

TECHNICAL FIELD

The present invention relates generally to wireless communications and gateway services; and more specifically, to a method for implementing an Intelligent Content Rating middleware platform and gateway system

SUMMARY OF THE INVENTION

Implemented as part of a computer program product, the method for implementing an Intelligent Content Rating middleware platform and gateway system, exists as a telecommunications network element which transparently intermediates IP data flow, providing highly scalable, manageable and reliable data classification functionality at wire speeds, in parallel with the implementation of content-based filtering, forwarding, monitoring and accounting services per traffic of interest.

The art employs a powerful underlying Layer 4-7 switching fabric to support traffic classification by content, monitoring and generating a wide range of packet traffic information. The invention thereby enables telecommunications carriers to discern the type and content of services being accessed by wireless subscribers as well as the protocols transported. Indeed, the network operator may differentiate traffic by source, by content (file) type, by protocol or by port (as an illustration, a differentiation may be had between video on an internal server and audio from the internet).

The computer program product which helps implement the method for implementing an Intelligent Content Rating middleware platform and gateway system is articulated to intermediate Hyper-Text Transfer Protocol (HTTP) traffic, and invokes configured actions based on the content requested. (Practitioners, will readily recognize that the reference to HTTP remains in keeping with the current teachings of the state of art, and other communications protocols as SIP for instance, may well be substituted without diluting the intent, scope and/or industrial applicability of the invention of present). The HTTP request may be directed to servers both within and external to the telecommunications carrier or similar such entity. The invention sits at the access gateway point, between the carrier's Internet Protocol (IP) network and the intranet/internet. The particular location of the invention allows for inspection of all HTTP headers (in this instance) generated by and directed to a subscriber's mobile handset or device to enable monitoring, content blocking, content embellishment, re-routing, and content-based rating.

An aspect of the specification provides an open architecture method and system for implementing an Intelligent Content Rating middleware platform and gateway system. The method and system can allow for the inspection of certain, discrete communication protocol headers generated by and directed to a wireless subscriber's mobile device to enable monitoring, content blocking, content embellishment, rerouting, and content-based rating. Such communication protocols can include, inter alia, HTTP and SIP. The method can be implemented as part of a computer program product including instructions for facilitating said monitoring, content blocking, content embellishment, rerouting, and content-based rating on a computer readable memory medium. The rules or instructions can be loaded into the logical memory of the computer product. Whereupon loading the rating rules into the computer product, a set of system level triggers can be armed to detect the occurrence of the set of events. The triggers are armed (real time) on the basis of the content requested (hostname, port, path, filename), and/or various protocols specific to the state of the art (as HTTP and HTTPS). A logical decision tree can be created based upon the rating rules for analyzing and determining the requisite protocols, fields, addresses or content in question. The packet can be analyzed in according with the rules and logic specific thereto.

DETAILED DESCRIPTION OF THE PREFERRED EMBODIMENTS

Members skilled in the art will recognize that the ensuing represents an illustrative recital of the preferred embodiments of the invention of present and other embodiments may be articulated, gleaned and articulated from such while still remaining with in its spirit and scope. Indeed, equivalents found within the state of the art, and those which may reasonably and effectively be deemed equivalent in the future should also be understood as being incorporated by reference hereto and such. Furthermore, much of the language has been illustrative and is to be construed as expressly for pedagogical purposes in helping elucidate the art as concisely and beneficially as practical.

Figure 1:
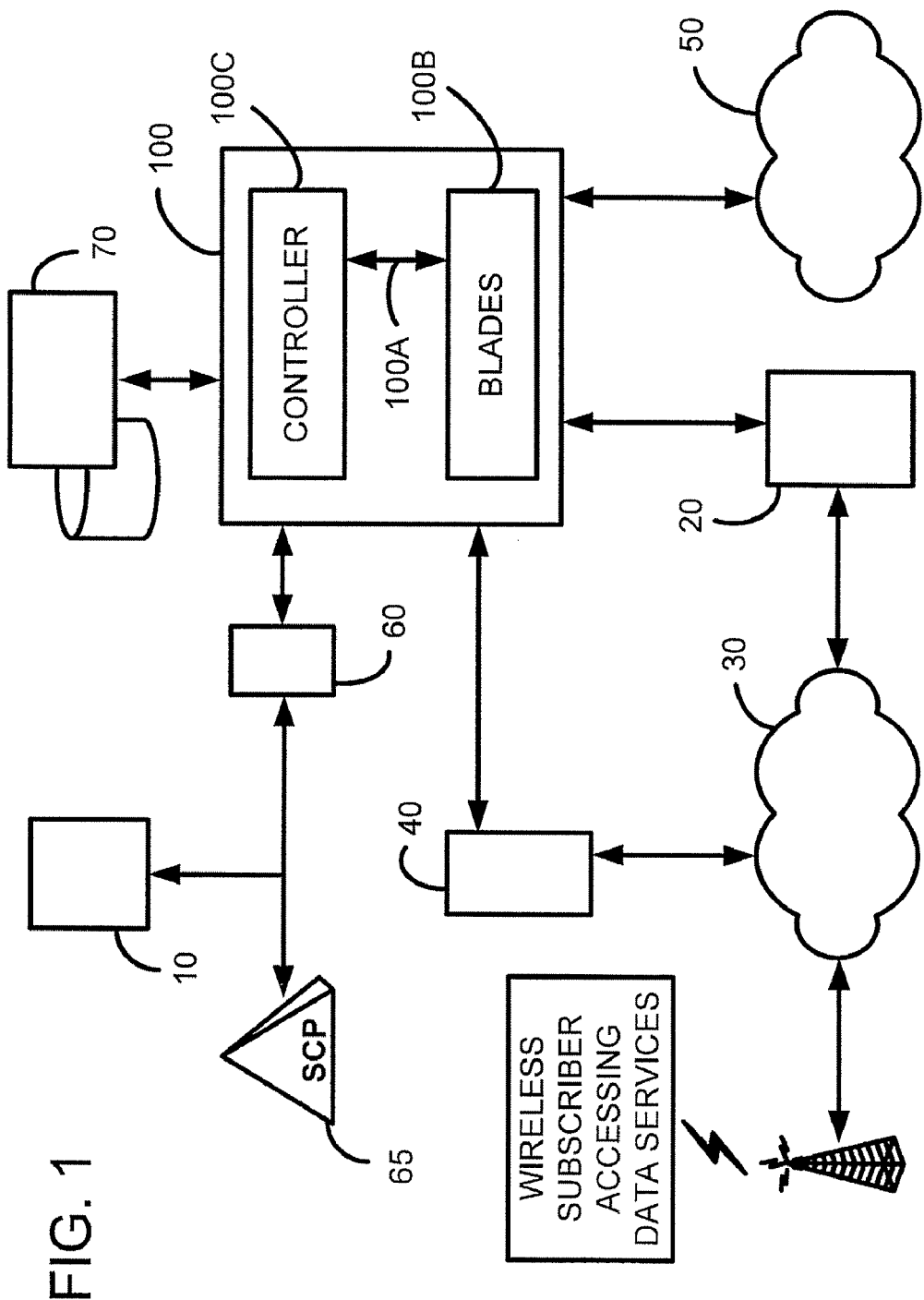
FIG. 1 illustrates a typical, non-limiting embodiment of the system level architecture employed in the disclosure of present invention.

The computer program product which helps implement the method for implementing an Intelligent Content Rating middleware platform and gateway system is articulated to intermediate Hyper-Text Transfer Protocol (HTTP) traffic, and invokes configured actions based on the content requested. (practitioners; will readily recognize that the reference to HTTP remains in keeping with the current teachings of the state of art, and other protocols (as SIP for instance) may well be substituted without diluting the intent, scope and/or industrial applicability of the invention of present). The HTTP request may be directed to servers both within and external to the telecommunications carrier or similar such entity. With reference to FIG. 1, in the preferred embodiment, the invention 100, which can also be referred to as a middleware platform, sits at the access gateway point 20, between the carrier's Internet Protocol (IP) network 30 and the intranet/internet 50. The particular location of the invention allows for inspection of all HTTP headers (in this instance) generated by and directed to a subscriber's mobile handset or device to enable monitoring, content blocking, content embellishment, re-routing, and content-based rating.

Continuing with reference to FIG. 1, the RADIUS Proxy Server 40 checks the master data to confirm that the account in question is active, via Lightweight Directory Access Protocol (LDAP) or Remote Authentication Dial In User Service (RADIUS). Practitioners skilled in the art shall recognize that a variety of protocols will disclose the implementation of said architecture without affecting the intent and scope of the present invention. Where the returned response is negative (not shown) an authorization reject is returned.

The invention 100, makes a request to an Open Charging (OC) middleware platform and gateway system 60 as detailed in patent application Ser. No. 10/307,335 to confirm the status of the account in question and related profile capabilities. Technicians skilled in the art will recognize that the invention of present need not be limited to the aforementioned Open Charging (OC) middleware platform and gateway system and other similar network implementations may be employed without diluting the intent and scope as such.

The Open Charging (OC) middleware platform and gateway system 60 accesses the subscriber account server 65 (SCP), removing the access charge from the account (prepaid). Where the account cannot support the requested charge then a negative response is returned (not shown) and a negative authorization is passed returned as a failed access request. (The postpaid billing scenario is represented as a postpaid billing server 10).

From the Unified Rating Service 70 the user profile in question is recovered. In the preferred embodiment, assuming both the account check, and the profile were positive an authorization accept is returned.

The invention 100 preloads the said user profile and loads the rating plans, as a result, when the first user data packet is received the gateway controller 100C, already has a complete user profile built.

The invention's 100 Controller—Blade interface 100A includes messages which transmit configuration, matching, action and subscriber data from the Controller 100C to the Blades 100B, as well as messages which act as a mechanism for transmitting updated subscriber data from the Blades 100B to the Controller 100C. On initialization, each Blade 100B requests configuration information as well as a full copy of the rating, matching and action data from the invention's Controller 100C.

When the invention's Blade 100B creates a session for a wireless subscriber, it requests the subscriber information from the Controller 100C. The data transmitted includes both the wireless subscriber's group (which corresponds to a list of the Uniform Resource Identifiers (discussed below) Matching Rules which apply for the subscriber) and the Digital Rights Management (DRM) (discussed below) cache items for the subscriber. The Blades also update the DRM data for subscribers by sending the relevant message to the Controller.

The invention employs real-time monitoring on layer 4-7 of the Open Systems Interconnection (OSI) reference model to implement content classification and rating on data traffic. Upon loading of rating rules onto the system, a set of system level triggers are armed to detect the occurrence of the set of events required by the rating criteria. Triggers can be armed on a real time basis through the provisioning interface which link to a set of underlying API's. Triggers are armed based on the content requested, on protocols including HTTP and HTTPS.

The computer program product which implements the method for implementing an Intelligent Content Rating middleware platform and gateway system employs advanced and powerful Uniform Resource Identifier (URI) matching logic to differentiate between actionable and non-actionable content according to a configurable set of rules as defined by a practitioner skilled in the art. Non-limiting illustrations of such matching rules include any combination of, protocol, IP address, hostname, port, path, filename, query string (among others), all of which may be specified precisely or with regular expressions and wildcards for greater flexibility. These rules give substantial control over what content is marked as actionable and allow the totality of the art disclosed herewith, to deliver an advanced content-based charging and rating solution.

In helping advance the state of the art, the logic has been refined to facilitate the notion of Interesting URIs (I-URI). For the purposes of illustration, each (I-URI) may be defined by the combination of any (or more) of the following fields from Table 1. Each of the parameters (Table 1) may be specified explicitly, or by a string of literal characters pre- or post-fixed, or both, by the asterisk wildcard character. The asterisk matches zero or more literals. A URI Matching Rule consists of one or more Interesting URIs against which all requested URIs are compared. The actions associated with a URI Matching Rule are triggered if any of the Interesting URIs associated with it match the requested URI.

TABLE 1

Illustrative Interesting URI Parameters

| Parameter Name | Description | Default Value |
|---|---|---|
| Protocol | The component of the URI indicating what scheme is being used to identify the desired resource. This component occurs at the left of the URI and is terminated at the first colon (':'). | http |
| Host | The component of the URI indicating the server hosting the requested resource. For HTTP URIs, host is defined as "The host is a domain name of a network host, or its IPv4 address as a set of four decimal digit groups separated by '.'" and follows immediately after the protocol. | *(any) |
| Port | The component of the URI indicating the network port number for the server. In an HTTP URI, the port is optional is included after the host, prefixed with a colon (':'). | 80 |
| Path | The component of the URI containing data used to identify the desired resource within the scope of the requested protocol, host and port. Composed of a number of segments each prefixed by the slash ('/') character. | [none] |
| Query String | The component of the URI containing information to the interpreted by the requested resource. For HTTP URIs the query part follows the path and is separated from is with a question mark ('?'). The query string is made up of name/value pairs in the format 'name=value', with pairs separated by the ampersand character ('&'). Multiple name/value pairs may be specified to be matched in each Interesting URI. Query string matching is order-independent and all defined query strings must match the URI being requested for a URI match to occur. For example, if the URI requested is:<br>http://www.anywebsite.com/index.html?first=Joe&last=Smith&age=25 | [none] |

TABLE 1-continued

Illustrative Interesting URI Parameters

| Parameter Name | Description | Default Value |
|---|---|---|
| | If the query string components defined in the Interesting URI are "last=Sm*" and "first=Joe", the URI will match.<br>If the query string components defined in the Interesting URI are "first=Joe" and "age=20", the URI will not match. | |

The invention permits telecommunications carriers and network operators the requisite flexibility and fluidity over the actions which occur when subscriber's trigger matches though the URI Matching Engine. All actions performed when URIs are matched by the URI Matching Engine are defined by mechanisms labeled as 'Action Plug-ins'. Action Plug-ins are implemented as Java classes (or suitable equivalent per the state of the art) conforming to the Action Plug-in API and use information from the HTTP request and response messages to perform required system functions. An Action Plug-in, when triggered by a URI Matching Rule, is provided with the details of the HTTP message in question including all HTTP headers. Said plug-ins are also provided with parameters defined in the URI Matching Rule. The plug-in uses the HTTP data to perform tasks, which for instance may innovatively include call-outs to remote systems.

Action Plug-ins are triggered by URI Matching Rules when the invention discovers a request for an Interesting URI. Each URI Matching Rule may be associated with several Actions Plug-ins, and they may be prioritized to execute in any order.

Action Plug-in code is invoked at two stages of the HTTP Request/Response cycle. First, when an HTTP Request is determined to match an Interesting URI associated with a URI Matching Rule, any Action Plug-ins associated with the Matching Rule are executed in sequence. Furthermore, once the HTTP Request has been proxied to the Internet/intranet, upon the return of one or more HTTP Responses, the Action Plug-ins associated with the Matching Rule are invoked again. The order of plug-in execution is reversed when processing HTTP Responses, plug-ins which execute first in the HTTP Request sequence will execute last in the HTTP Response sequence. Thus, each Action Plug-in will have two associated behaviors, one for processing HTTP Requests and one for processing HTTP Responses. An Action Plug-in may include definitions of either one of these behaviors, or both, depending on the action required to be performed.

In elucidating the art further, sample Plug-ins may include, Age Verification, Opt In, Subscription, Reroute and Block. The Age Verification plug-in for instance may allow telecommunication carriers to query a subscriber to determine that they remain of an age suitable to view the content being requested. When an HTTP Request triggers the Age Verification plug-in, the plug-in intercepts the HTTP Request and returns a HTTP Response to the subscriber's device. The Response consists of a dynamically created page which contains the Age Verification screen and contains a link to the originally requested content. The Age Verification plug-in can be configured to request verification for every content access, only for the first access per subscriber or to request verification when a configurable time interval has expired since the last age check. The Age Verification plug-in uses the DRM cache to store information regarding previous subscriber age verifications. Likewise, the Opt In plug-in facilitates a method of requesting one-time verification from a subscriber that they wish to access certain content. Similar to the Age Verification plug-in, the HTTP Request is intercepted and an Opt In page is returned. The Opt In page contains a link to the originally requested content. The Opt In plug-in uses the DRM cache to store information regarding previous subscriber Opt Ins. The Subscription plug-in may enable a telecommunications carrier to charge for content—or groups of content defined as a set of Interesting URIs within a single URI Matching Rule—on a subscription interval basis. For example, a subscriber might choose to purchase access to all content under the http://footballnews.somedomain.com/ website for $5.00/week. The Subscription plug-in will query the subscriber upon the first access to such content, request authorization of payment and then allow access to the content until the subscription expires. Similar to the Age verification plug-in, the HTTP Request is intercepted and an Advice of Charge screen is returned, requesting authorization from the subscriber to apply a charge to their account—the value and duration of the subscription are defined in the URI Matching Rule and passed to the plug-in as parameters. The Subscription plug-in uses the DRM cache (explained below) to store information regarding current subscriptions. The Subscriptions plug-in interfaces with the Open Charging (OC) middleware platform and gateway system (represented at 60 in FIG. 1 to manage balances for prepaid subscribers, including balance queries and deductions. Technicians skilled in the art will recognize that the invention of present need not be limited to the aforementioned Open Charging (OC) middleware platform and gateway system and other similar network implementations may be employed without diluting the intent and scope as such. The Subscription plug-in may be configured to intercept HTTP Responses as well. In this state, the plug-in ensures that subscribers are not charged for content which is not available immediately after purchase by monitoring the HTTP responses for error codes. With this configuration, the subscription charge is not applied to the subscriber account until it is verified that the content is available to be downloaded by the subscriber. If the HTTP Response indicated that the content is not available, a charge is not applied and the subscription is removed from the subscriber's account. Finally, the Reroute plug-in may readily intercept HTTP Requests for URIs which match a URI Matching Rule and returns an HTTP Redirect to a URI defined in the URI Matching Rule and passed to the plug-in as a parameter, whereas, the Block plug-in intercepts HTTP requests for URIs which match a URI Matching Rule and returns an HTTP Response indicating that the content has been blocked.

Figure 2:
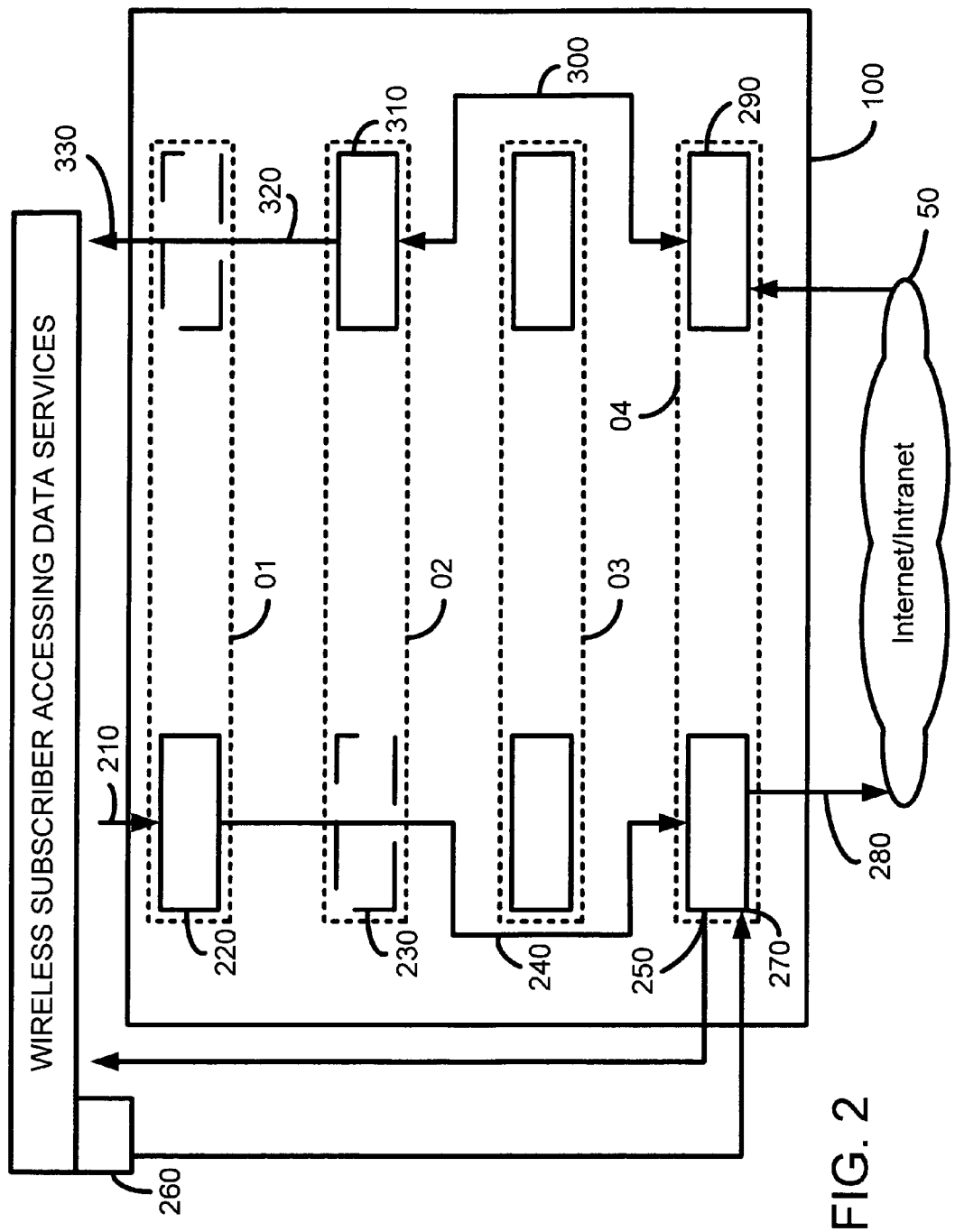
FIG. 2 illustrates the Action Plug-in sequence.

FIG. 2 has been provided herewith to illustrate the Action Plug-in sequence in greater sufficiency. (To preserve ease of instruction, relevant labels from FIG. 1 has been incorporated into FIG. 2).

With reference then to FIG. 2, when a wireless subscriber requests some content via HTTP 210, the URI in the HTTP Request matches an Interesting URL in some URI Matching Rule and the Blade of the invention (not shown here) routes the HTTP Request to the associated Action Plug-ins for processing. At the first Action Plug-in, the first plug-in in the sequence 01, is activated 220 by the invention 100. This plug-in 220 does some processing of the HTTP Request, but does not return an interstitial screen to the subscriber. The second Action Plug-in 02 in the plug-in sequence depicted, does not implement HTTP Request processing so it is not activated 230 by the invention's logic 100 at this time.

Still continuing with FIG. 2, the third Action Plug-in in the plug-in sequence 03 has an active DRM record for the current subscriber so it is not activated 240 by the invention in this illustration at this time. The fourth Action Plug-in in the plug-in sequence 04 is activated by the invention's 100 logic. The Plug-in, intercepts the HTTP Request and returns an interstitial screen 250 (perhaps an Advice of Charge screen) (if relevant) to the subscriber. In doing so, the plug-in requests that the invention 100 cache the current HTTP transaction state so that processing can be resumed when the subscriber clicks through the interstitial screen. The Plug-in requests a URI from the framework and embeds it in an HTTP Response which is delivered to the subscriber.

At 260, the interstitial screen is displayed on the wireless subscriber's device. The subscriber clicks through using the link embedded in the page by the plug-in. At 270, the URI embedded in the interstitial screen causes the invention to reestablish the HTTP transaction. The Action Plug-in is reactivated and notified of the subscriber's action on the interstitial screen. The plug-in passes control on, (perhaps) after modifying some account data. Then the HTTP Request is proxied to the internet 280, and an HTTP Response is returned.

The Action Plug-ins are activated by the invention 100 for HTTP Response processing in reverse order (i.e. the last plug-in to process the HTTP Request is the first plug-in to process the HTTP Response). The fourth Action Plug-in 04, now therefore becomes the first plug-in in the Response sequence 290. (Where this may have been articulated as a Subscription plug-in, this processor might ensure that if the HTTP transaction was not successful that the subscriber's subscription transaction is rolled back).

Continuing with the illustration (FIG. 2), the third Action Plug-in 03 has an active DRM record for this subscriber, and therefore not activated 300 by the invention 100. The second Action Plug-in 03 is activated 310 for HTTP Response processing. In advancing the literature and art, said plug-in might scan the HTTP Response for inappropriate content, or strip images and other media from HTML pages for faster browsing. In any case, the modified HTTP Response is passed on to subsequent plug-ins. The final Action Plug-in 01 is then activated. This plug-in has no HTTP Response processor, so it is not activated 320 by the framework. The HTTP Response is proxied 330 to the subscriber's device and displayed to the subscriber.

Other elements of the invention provides for the implementation of novel content subscription solutions. The so-labeled Digital Rights Management (DRM) Cache is an articulated repository which stores data relating to each wireless subscriber's access and history of access to content.

Sample elements of the DRM Cache may encapsulate the items delineated in Table 2 (below).

TABLE 2

Sample DRM Cache Data

| Parameter | Description |
| --- | --- |
| Subscriber | Each DRM Cache item will refer to the rights of a specific subscriber. |
| Content | The content referred to by a DRM Cache item is that which is specified by a particular URI Matching Rule - the resources which are accessible by the set of URIs which are matched by the rule. |
| Plug-in | The plug-in which created the DRM Cache item and to which it relates. |
| Expiry Date/ Time | A timestamp indicating the time after which the DRM Cache item is no longer valid. DRM Cache entries which have expired will be removed by a batch process. Before a URI Matching Rule triggers an Action |

TABLE 2-continued

Sample DRM Cache Data

| Parameter | Description |
|---|---|
| | Plug-in, the DRM Cache is queried for entries that match the particular subscriber, content and plug-in. If there exists such an item, with an expiry date/time in the future and with a status of 'Active' (see next section), the plug-in is triggered. |
| Status | An integer indicating whether or not the plug-in referenced by the item should be triggered for the referenced content and subscriber. There are two possible statuses, 'Active' and 'Inactive'. An 'Active' item indicates that the plug-in should not be triggered while an 'Inactive' plug-in indicates that the plug-in should be triggered. While the invention may inevitably only two DRM statuses, the status field is an integer to facilitate the implementation of stateful Action Plug-ins. Positive values correspond to the 'Inactive' state and a value of zero corresponds to the 'Active' state. Negative values are reserved for system use. |

The DRM Cache is used by the invention to determine when to trigger Action Plug-ins when subscribers request URIs marked as interesting in a URI Matching Rule. When the logic of the invention discovers a request for an interesting URI, the DRM Cache is queried for any entries relating to that subscriber and content. As each item in the sequence of Action Plug-ins associated with the URI Matching Rule is examined, the queried records are examined. If the queried records include an item for the plug-in, with 'Active' status and an expiry date/time in the future, then the plug-in is not triggered, otherwise—either if there is no such item, its status is not 'Active' or it has expired—the plug-in is run. The DRM Cache may have no more than one entry for any combination of subscriber, content and plug-in.

Other elements of the invention being disclosed provide functionality for the injection of interstitial screens into the IP flow between the subscriber and a content provider. Interstitial screens are triggered and injected into the IP flow by Action Plug-ins which are activated by the URI Matching Engine. Action Plug-ins inject interstitial screens into the IP flow using the Action Plug-in interface. If the plug-in's HTTP Request handler wishes to intercept an HTTP Request and return an interstitial screen to the subscriber, the framework provides a mechanism for allowing the plug-in to resume processing the current HTTP Request once the screen has been presented to the subscriber and the desired action taken.

Furthermore, in alternate embodiments, the invention has provided telecommunications carriers with the ability, art and know how to provision individual or groups of subscribers into customized groups. Each group defines a set of URI Matching Rules which are applied to the traffic of its subscribers. With subscriber groups enabled, only those rules defined in a subscriber's group are applied to that subscriber's traffic. Where simplicity lies at the heart, innovatively, a subscriber group is merely defined as a subset of the URI Matching Rules configured within the logic of the computer program product which implements the invention herewith seeking the protection of Letters Patent. Each subscriber is associated with one group. When the invention evaluates a requested URI to determine what actions to trigger, only Interesting URIs associated with URI Matching Rules in the subscriber's group are checked. One group may be defined to be the default, and will be applied to all subscribers who have not been provisioned into a subscriber group.

The embodiments of the invention in which an exclusive property or privilege is claimed are:

1. A middleware gateway system comprising:
a carrier network for carrying traffic to and from a wireless device connected to said carrier network;
a second network for providing content in response to a content request from said wireless device;
a middleware platform configured to connect to said carrier network via a first link and configured to receive said content request from said wireless device via said first link, said first link comprising a connection between said middleware platform and an access gateway point associated with said carrier network;
said middleware platform further configured to connect to said second network via a second link and to carry traffic between said carrier network and said second network;
said middleware platform configured to maintain a record containing at least one predefined identifier and to perform a determination as to whether at least one of said content request and a response to said content request includes content that matches one or more of said predefined identifiers;
said middleware platform further configured to rate said response and to perform one or more of blocking, embellishing and re-routing said response based on results of said determination;
said middleware platform further configured to connect to a billing element via a third link discrete from said first and second links, for managing a subscriber account balance in association with said at least one of blocking, embellishing, re-routing, and rating;
said middleware platform additionally connected to a service control point via said third link for deducting a balance from a prepaid wireless account based on said rate.

2. The system of claim 1, wherein said identifiers include communication protocol headers associated with said content which are generated by and directed to said wireless device.

3. The system of claim 2, wherein such communication protocols comprise at least one of hyper-text transfer protocol (HTTP) and Session Initiation Protocol (SIP).

4. The system of claim 1, wherein said predefined identifier comprises rules loaded into logical memory of said middleware platform, said rules including at least one of a protocol, a domain name, a port, a path and a query string.

5. The system of claim 4, whereupon loading the rating rules into the middleware platform, a set of system level triggers are armed to detect the content request being received at said middleware platform and to determine whether said request includes content that matches one or more of said predefined identifiers.

6. The system of claim 5, wherein said triggers are real time triggers on the basis of characteristics of said content request; said characteristics including at least one of (a hostname, a port, a path, a filename), and a protocol.

7. The system of claim 5, wherein said middleware platform is configured to maintain a logical decision tree based upon said rules.

8. The system of claim 7, whereby said content request is comprised of packets and each of said packets are analyzed according to said rules.

9. The system of claim 1 wherein said identifier is an Interesting Uniform Resource Identifier (URI).

10. The system of claim 1 wherein said middleware platform is further configured to perform digital rights management in relation to responses to said content request destined for said wireless device.

11. The system of claim 1 wherein said embellishment comprises said middleware platform being configured to provide an interstitial screen to said wireless subscriber device prior to permitting said response to be delivered to said wireless device.

12. The system of claim 11 wherein said interstitial screen advises a subscriber of said wireless device of a charge associated with providing said response.

13. The system of claim 1, said middleware platform additionally connected to a post paid billing server for adding a balance to a post paid wireless account based on said rate.

14. A method for implementing a middleware platform comprising:
receiving a content request from a wireless device via a carrier network at a middleware platform; said middleware platform connected to said carrier network via a first link, said first link comprising a connection between said middleware platform and an access gateway point associated with said carrier network, said middleware platform connected to a second network via a second link; said content request destined for said second network;
maintaining at said middleware platform a record containing at least one predefined identifier;
determining at said middleware platform whether said request includes content that matches one or more of said predefined identifiers;
performing at said middleware platform rating of said content and one or more of blocking, embellishing and re-routing said content based on results of said determining step;
managing by said middleware platform, in association with performing said rating and said one or more of blocking, embellishing and re-routing, a subscriber account balance associated with a billing element; said middleware platform connected to said billing element via a third link discrete from said first and second links;
transmitting a request from said middleware platform for deducting a balance from a prepaid wireless account at a service control point based on said rating, said middleware platform connected to said service control point via said third link.

15. The method of claim 14, wherein said identifiers include communication protocol headers associated with said content which are generated by and directed to said wireless device.

16. The method of claim 15, wherein such communication protocols comprise at least one of hyper-text transfer protocol (HTTP) and Session Initiation Protocol (SIP).

17. The method of claim 14, wherein said predefined identifier comprises rules loaded into logical memory of said middleware platform, said rules including at least one of a protocol, a domain name, a port, a path and a query string.

18. The method of claim 17, whereupon loading the rating rules into the middleware platform, additionally arming a set of system level triggers to detect the content request being received at said middleware platform and determining whether said request includes content that matches one or more of said predefined identifiers.

19. The method of claim 18, wherein said triggers are real time triggers on the basis of characteristics of said content request; said characteristics including at least one of a hostname, a port, a path, a filename, and a protocol.

20. The method of claim 18, further comprising maintaining at said middleware platform a logical decision tree based upon said rules.

21. The method of claim 20, whereby said content request is comprised of packets and each of said packets are analyzed according to said rules.

22. The method of claim 14 wherein said identifier is an Interesting Uniform Resource Identifier (URI).

23. The method of claim 14 further comprising performing at said middleware platform digital rights management in relation to responses to said content request destined for said wireless device.

24. The method of claim 14 wherein said embellishing comprises providing an interstitial screen from said middleware platform to said wireless subscriber device prior to permitting said response to be delivered to said wireless device.

25. The method of claim 14 wherein said interstitial screen advises a subscriber of said wireless device of a charge associated with providing said response.

26. The method of claim 14 further comprising transmitting a request for adding a balance to a post paid wireless account based on said rate.

* * * * *